March 11, 1958   G. M. SNYDER   2,826,017
LOADING AND UNLOADING STRUCTURE WITH ARTICLE EJECTOR
Filed Dec. 22, 1955   4 Sheets-Sheet 1
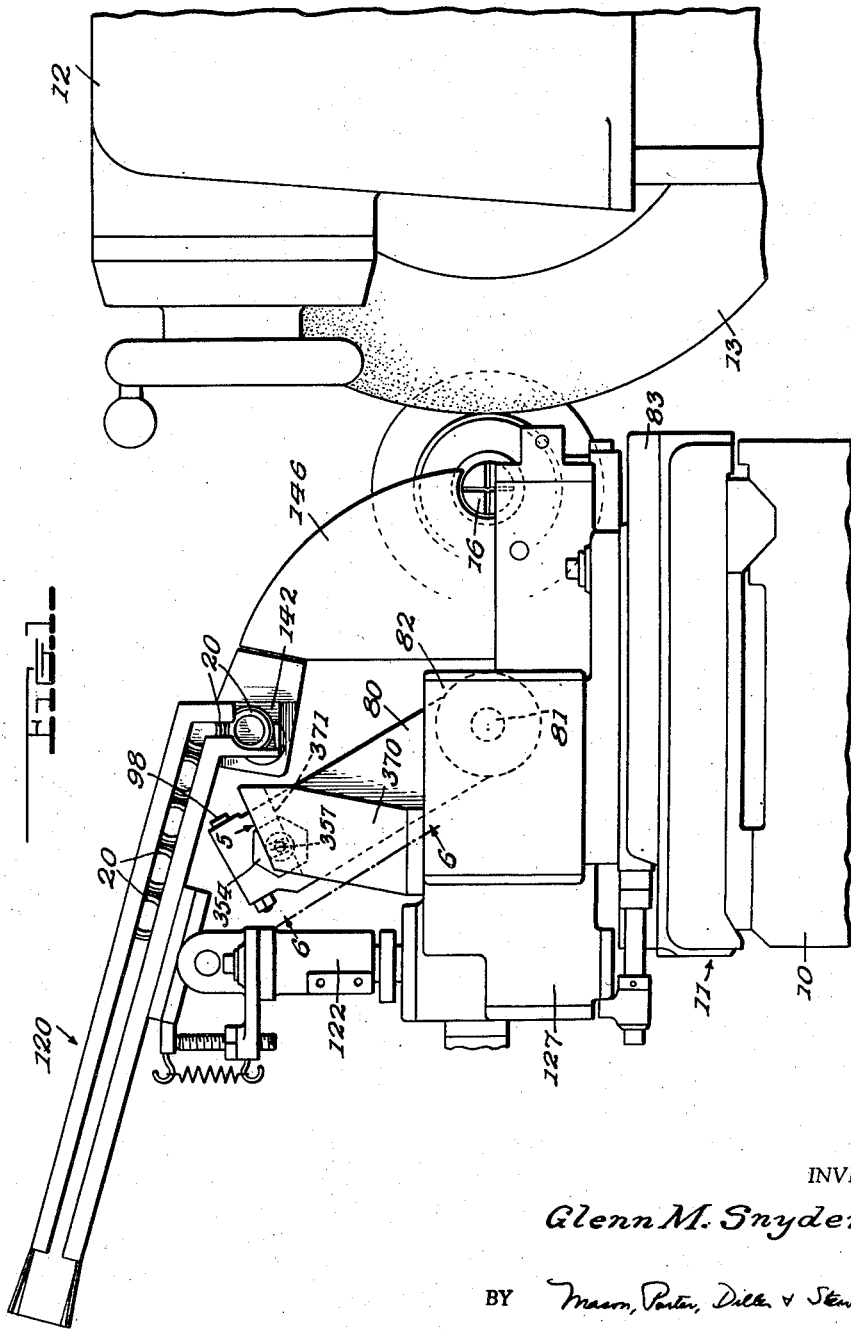
INVENTOR
Glenn M. Snyder
BY Mason, Porter, Diller & Stewart
ATTORNEYS

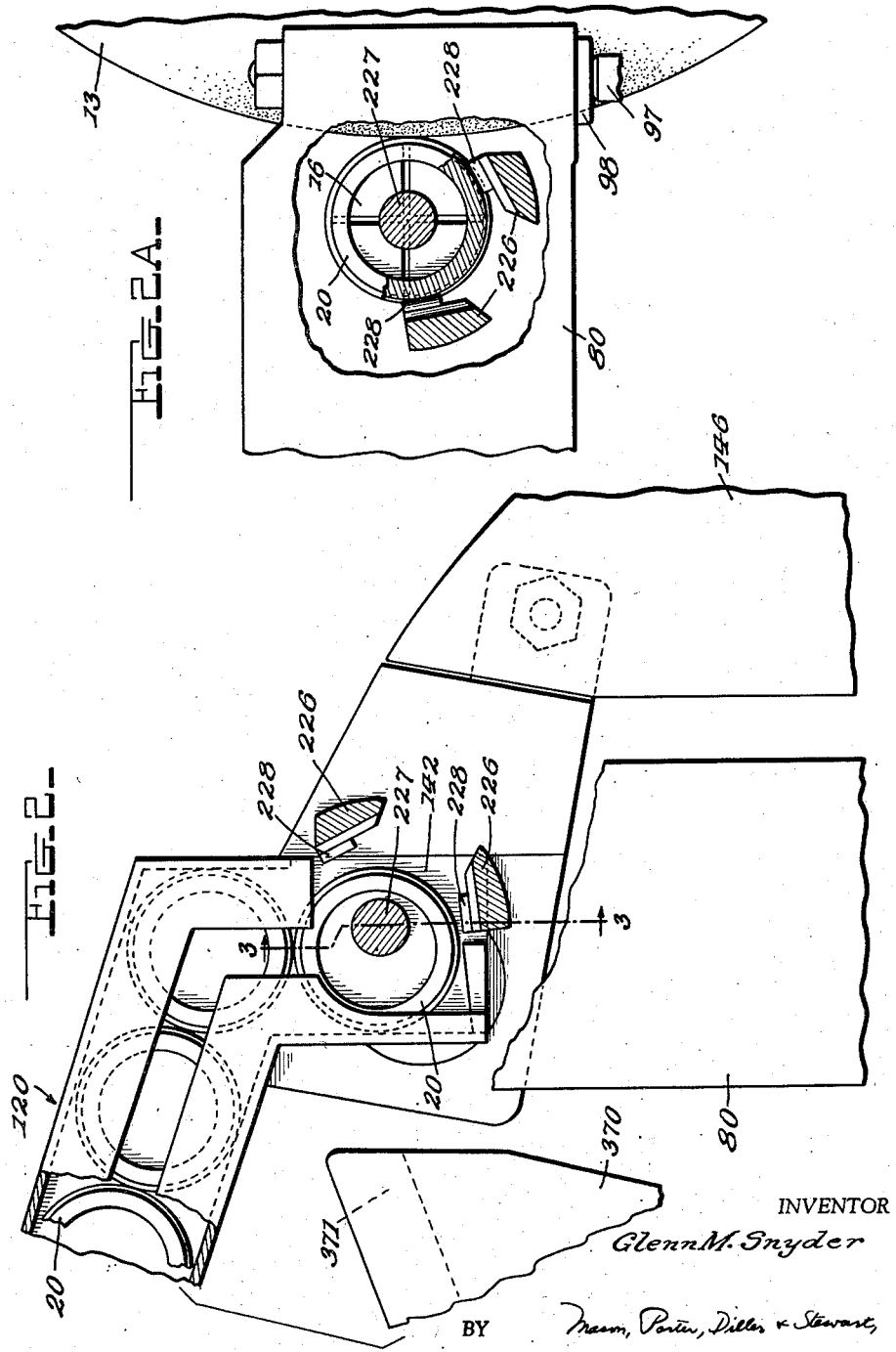

March 11, 1958      G. M. SNYDER      2,826,017
LOADING AND UNLOADING STRUCTURE WITH ARTICLE EJECTOR
Filed Dec. 22, 1955      4 Sheets-Sheet 3
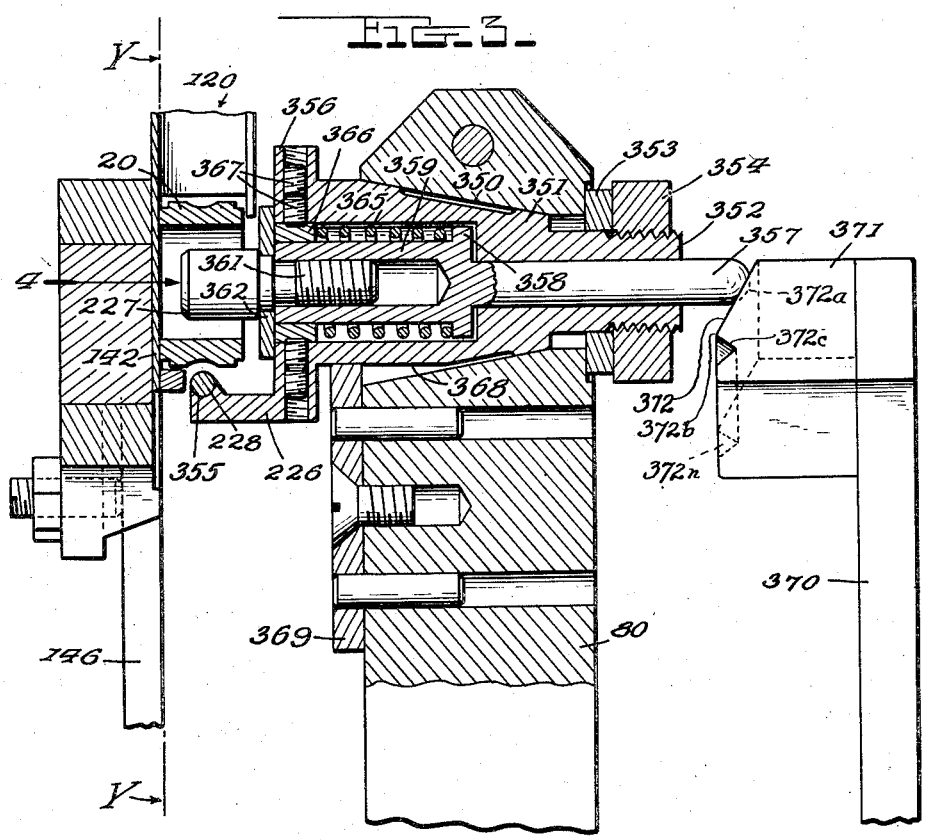
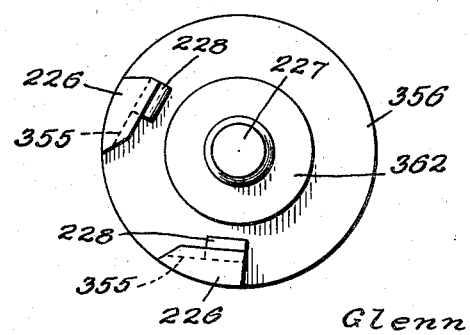
INVENTOR
Glenn M. Snyder
BY Mason, Porter, Diller & Stewart,
ATTORNEYS March 11, 1958 G. M. SNYDER 2,826,017
LOADING AND UNLOADING STRUCTURE WITH ARTICLE EJECTOR
Filed Dec. 22, 1955 4 Sheets-Sheet 4
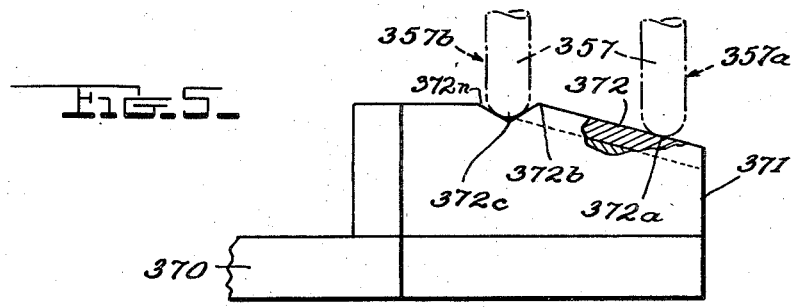
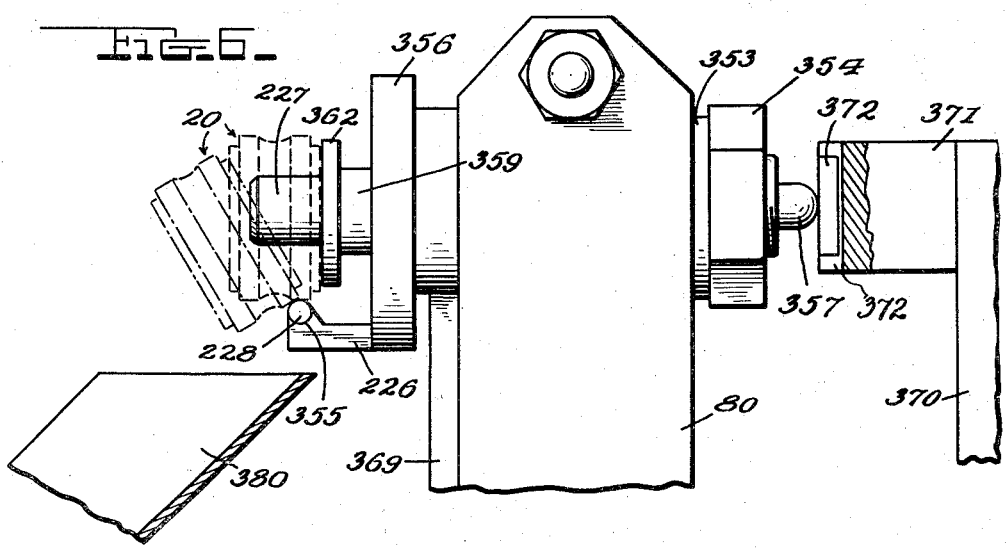
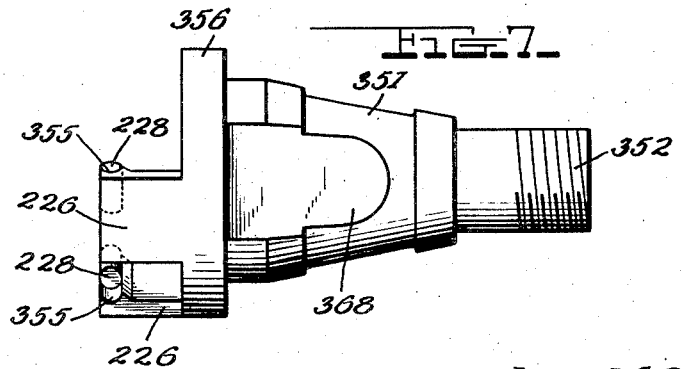
INVENTOR
*Glenn M. Snyder*
BY *Mason, Porter, Diller & Stewart,*
ATTORNEYS United States Patent Office 2,826,017
Patented Mar. 11, 1958

2,826,017

LOADING AND UNLOADING STRUCTURE WITH ARTICLE EJECTOR

Glenn M. Snyder, Waynesboro, Pa., assignor to Landis Tool Company, Waynesboro, Pa., a corporation of Pennsylvania Application December 22, 1955, Serial No. 554,728

9 Claims. (Cl. 51—215)

This invention relates to improvements in loading and unloading structures for delivering articles to and from a machine.

An object of the invention is the provision of an article carrier which can be moved from a loading station to a work position at the machine, and then to an unloading station at which a positive ejection of the article can be accomplished.

Another object is the provision of an article carrier having thereon devices for accepting an article at a loading station and moving the article to a work position at which it is supported by parts on the carrier, and including elements effective upon further movement from the work position to an unloading station for displacing the article relative to said devices and ejecting it.

A further object is the provision of an article carrier having devices for engaging inner and outer surfaces of a hollow article, and including ejection means for pressing the article away from certain of said devices whereby it is placed in a position of unstable equilibrium for gravitational discharge.

With these and other objects as features in view, as will appear in the course of the following description and claims, an embodiment of the invention is shown, illustratively applied to a grinding machine as described and claimed in the copending application of Harold E. Balsiger, Serial No. 414,198, filed March 4, 1954, by the accompanying drawings, in which:

Fig. 1 is an upright view showing the general assembly of parts of a grinding machine with a loading and unloading structure of the present invention applied thereto.

Fig. 2 is a corresponding view, on a larger scale, showing certain of the parts, in an intermediate position.

Fig. 2A is a view corresponding to a part of Fig. 2, but with the loading arm in the grinding position, and parts broken away to show the reaction supports.

Fig. 3 is in part an elevation and in part a section on line 3—3 of Fig. 2.

Fig. 4 is an end view, from the direction shown by the arrow 4 in Fig. 3.

Fig. 5 is a top view of the cam device, from the direction shown by the arrow 5 in Fig. 1.

Fig. 6 is a view corresponding to a part of Fig. 3, but with the parts in discharging position, the cam structure being shown from the direction of the line and arrows 6—6 in Fig. 1.

Fig. 7 is a side view of a carrier plug.

The illustrative employment of the loading and unloading structure with a grinding machine is shown in Figs. 1, 2 and 2A, in which a machine bed 10 has the support 12 for grinding wheel 13. A carriage 11 on the bed has a slide 83 for the article handling parts including a base 82 on which the swinging or carrier arm 80 is mounted by a pivot 81 for movement in a vertical plane. The housing 127 contains mechanism (not shown) for producing and timing the movements of the arm 80 and other parts including the column 122 which supports a magazine 120 by which the articles 20 are successively delivered to a pick-off or receiving station (Fig. 1) on plate 142 when the arm 80 is in the full-line position shown in Fig. 2. The surface of plate 142 which can guide the article is alined during the loading operation with the surface of a guide plate 146 on base 83, along which plate an article may be slid from the receiving station to the working station (Fig. 2A) at which the stop 98 on the arm 80 is engaged with the fixed stop 97, and at which a magnetic chuck 16 can support an end surface of a steel article during the grinding operation. During loading, the surfaces of plates 142 and 146 and the chuck 16 are in a plane Y as shown in Fig. 3; noting that, when the magazine 120 is swung with column 122, the next article is moved away with the plate 142, so that the article just ground can be moved with swing arm 80 along guide plate 146 from the working station and thence to an unloading station, in which the arm 80 is in the position of Fig. 1.

The swinging arm 80 near its free end has a conical aperture 350 with its axis parallel to the grinding axis. This aperture 350 receives a conical plug 351 which has its smaller end extended by a threaded stud 352 projecting out of the aperture 350 for receiving a washer 353 and a clamp nut 354 whereby the plug can be held against shifting in the arm. At its larger end, the plug 351 has a peripheral flange 356. Projecting in the axial direction from the end surface of the flange 356 (Figs. 3 and 4) are the lugs 226, 226, each of which has a groove 355 in the face directed toward the axis of the plug 351, in which grooves are brazed work-supporting shoes 228, illustrated as short cylinders of radius slightly smaller than the radius of the peripheral groove in the steel inner ball-bearing race 20 illustrated as the article to be loaded, ground and unloaded; the intent being that the article will be supported (compare Fig. 2A) by the shoes 228 during the grinding and will be free to disengage from the shoes during the unloading.

The plug 351 is hollow, and receives an axially movable locating and discharging member having an ejector stem 357 guided in a smaller part of the plug bore, a flange portion 358 of larger diameter movable in a larger part of the plug bore, and a barrel portion 359 which is internally threaded to receive the threaded stem 361 of a locating piece having a finger 227 for entering the illustrative article. A washer 362 is held between the finger 227 and the end face of the flange 356.

A coil spring 365 surrounds the barrel portion 359 and acts against the flange portion 358, with reaction against a ring 366 inserted within the larger plug bore and held against axial movement by the pairs of screws 367 which act in threaded radial holes in the flange 356; the inner screw of each pair acting to clamp the ring 366 and the outer screw locking the inner screw against the release.

The plug 351 has a flat 368 which is engaged by the locating plate 369 for assuring its proper angular position in assembly and cooperating with the clamping nut 354 to maintain such position.

The machine base 83 rigidly supports a cam bracket 370 having a block 371 presenting a cam surface 372 positioned obliquely in the path of the end of the stem 357 so that it is engaged thereby when the arm 80 approaches the end of its outward or counterclockwise movement in Fig. 2. The surface 372 may be provided by wear-resistant material held by brazing in a locating groove of block 371; and of the proper shape for actuating the ejector stem 357. As the arm 80 travels counterclockwise (Fig. 1) in its discharging movement, the end of the ejector stem 357 travels in a path which intersects the cam surface 372 (Fig. 5), and then the stem 357 is compelled by the cam surface to move axially from the position of Fig. 3 to that of Fig. 6, corresponding to the positions 357a and 357b shown in Fig. 5, where the stem has first encountered the cam surface at point 372a, and has reached its maximum travel with arm 80 at point 372b: after the stem has passed the end of the ejection portion of the cam surface it makes a short, quick return into the notch 372n and thus to point 372c for assisting in the discharge of the article. The notch 372n on the cam surface 372 permits the quick withdrawal of the ejector, particularly the washer 362 which in the case of smaller articles has a tendency to adhere to the workpiece because of oil film present on both the workpiece and the washer. The quick withdrawal movement of the washer breaks the oil film and assures the discharge of the workpiece.

In operation, the empty carrier arm 80 is given a clockwise movement (Figs. 1 and 2) from the retracted or discharging position, by mechanism as illustratively shown in said copending patent application. As the stem 357 passes along the cam surface 372, it is held in contact therewith, being pressed toward the right (Fig. 3) by the spring 365. As the arm 80 comes to the end of the magazine 120, the magazine swings toward the arm and an article 20 held ready on the magazine plate 142 is picked up at this loading station, with the pin 227 entering the article and the shoes 228 ready to engage its periphery. The arm 80 continues its clockwise movement, with the pin 227 assuring the removal of the article from the magazine and with the article thereafter resting on shoes 228 and controlled by the washer 362 and the alined surfaces of the plate 142 and guide plate 146, until the arm movement stops with the article opposite the magnetic chuck 16 which attracts and holds it with its left-hand end (compare Fig. 3) engaged with the chuck and lying in the plane Y so that the article 20 is free of the washer 362 but supported by the shoes 228 against the grinding reaction. Grinding is accomplished in a centerless manner, with the article 20 reacting against and controlled by the shoes 228. The arm 80 is held accurately in position by the action of the stop 98 thereon. When the grinding is completed, a return or counterclockwise (Figs. 1 and 2) movement of the arm 80 is accomplished, illustratively as in the copending application; wherewith the pin 227 engages the inner surface of the article and removes it from the influence of the magnetic chuck 16. The arm 80 continues its return movement, with the article controlled by the washer 362 and the surface of guide plate 146, while resting on the shoes 228. As the arm 80 approaches the end of the magazine 120, this magazine is swung about the axis of column 122 so that the arm and article can pass. As the arm approaches the end of its return movement, with the finished article 20 now below the level of the magazine structure, the stem 357 encounters the cam surface 372 and is moved relatively to the left (Fig. 6), so that the washer 362 pushes the article 20 axially from the position in Fig. 3, and it travels on the shoes 228 toward the position shown in dash-lines in Fig. 6, wherewith its center of gravity is no longer above the projections 228 but leftward thereof so that the article tilts counterclockwise toward the dot-dash-line position in Fig. 6, and falls from position to a discharge chute 380.

It will be noted that at the loading station (Fig. 2) one of the shoes 228 is beneath the article while the other is opposite a side thereof, so that the finger 227 can enter the hole in the article and then move with the arm 80 until it encounters the inner surface of the article and strip it from any detaining means provided at the loading station, the article in such positions of the arm 80 being free to move relative to the shoes 228. As the arm 80 continues its loading movement, the article can roll with respect to the finger 227 so that upon attaining the working position (Fig. 2A) the article is resting upon the shoe 228 which is then lowermost. During the grinding, the reaction of the grinding wheel 13 is through the article toward the upper shoe 228, with guiding by the lower shoe independently of the finger 227 which is free of the article during at least the major portion of the grinding. During the return movement of the arm 80, the article can rest on the shoes 228 with guidance by the plate 146 and the washer 362 if the article should tilt, until the upright position (Fig. 2) is attained, whereupon the article can roll on the shoe 228 which is now lowermost and into a position (Fig. 6) in which it is suspended on finger 227 at a point above its center of gravity, though still in contact with the lower shoe 228 which engages the article groove. When the ejection occurs, the article is slid along this lower shoe with a relative lifting or swinging by the action of the shoe as the article shifts its fulcrum upon the shoe from the article groove to the article's raised edge, so that the article is in a position of unstable equilibrium. With its movement along the finger 227, the article thus attains a position at which it can swing about the shoe as a fulcrum and thus clear the finger 227, and the escape from the finger 227 being assisted by the quick return of the finger 227 and plunger stem 357 from the position 372b to position 372c (Fig. 5).

The structure is competent of quick and simple replacement of worn parts, and of interchanging for the grinding of articles of other sizes and shapes. The major wear points are the finger 227, and the shoes 228, each of which may be made of hardened steel and ground to size and shape before assembly. For use with a magnetic chuck, the thrust washer 362 is made of non-ferrous material so that magnetized work will not adhere to it. To accommodate the carrier to an article of a different size, the plug 351 and the parts therein and thereon can be quickly replaced by another plug having the shoes 228 at a different axial distance as in Figure 6 and with a finger 227 of appropriate diameter and length. With solid articles, the end portion of finger 227 may be omitted, and its end employed in lieu of a washer 362 for displacing the article during unloading. Thus, plug assemblies for various articles may be provided as stock items, with quick replacement as the work is changed.

It will be understood that the illustrated embodiment is not restrictive, and that the invention may be employed in many ways within the scope of the appended claims.

What is claimed is:

1. An article loading and unloading structure for a machine, comprising a support, a traveling carrier on said support movable from a position of machine work on the article toward the unloading position, an article holder on the carrier having devices for receiving reaction of the article during machine work thereon and for supporting the article during movement of the carrier toward an unloading position, a movable ejector mounted eccentrically on and movable with the carrier and means acting thereon to hold the same free of the article during machining, and means fixed on the support in the path of movement of the ejector for moving the same as the carrier attains the unloading position, said ejector upon movement by said fixed means being effective to cause the ejector to engage and displace the article relative to said supporting devices until it is in unstable equilibrium thereon.

2. A structure as the claim 1, in which the devices comprise a projection of the holder, and a shoe on said projection for engaging a lower surface of the article at the unloading position, and said ejector has a member movable transversely to the direction of travel of the carrier and engageable with a side of the article to push it across the shoe to the position of unstable equilibrium.

3. An article loading and unloading structure for a machine, comprising a support, a swinging arm on the support for movement from loading to working to unloading stations, said arm having a conical hole therein with the axis of the hole parallel to the axis of the arm, a hollow conical plug fitting said hole, means for securing the plug in position in the hole, a projection from the plug eccentric to its axis and a shoe on the projection for supporting an article, a plunger axially movable in the plug and having a stem projecting from the same at the end opposite the shoe, a spring in the plug for urging the plunger relatively away from the shoe, an article-engaging member on said plunger for displacing the article on the shoe when the plunger is moved against said spring, and a cam member on said support for engagement by the stem when the swinging arm approaches the unloading station.

4. A structure as in claim 3 for hollow articles, in which the plunger carries a finger for entering the article for moving the same with the stem.

5. A structure as in claim 3, in which the plunger has a part of longer diameter than the stem and the plug has an axial bore of two diameters, a smaller diameter accommodating the stem and a larger diameter for the said larger part of the plunger, said spring being located within said larger part of the hole and around the plunger, said plunger having a flange engaged with one end of the spring, a ring in the space between the plunger and the larger part of the hole and engaged with the other end of the spring, and means on the plug for holding the ring against axial movement.

6. A structure as in claim 3, in which the plunger has a larger and a smaller part with a peripheral flange therebetween, the smaller part forming the said stem, the hollow plug having a bore of two diameters, one for accommodating the stem and a larger one for receiving said flange, a ring within the larger diameter of the bore for guiding the larger part of the plunger, a spring in said bore and engaged at its ends with said flange and said ring, means for holding the ring against outward axial movement, an article-engaging finger having a threaded portion engaged in the plunger and having an outward shoulder adjacent said threaded portion, said article-engaging member being a washer surrounding the finger and held by said shoulder against the said plunger.

7. A structure as in claim 1 for supporting an inner ball race as the article, in which the said device is located eccentrically to the ejector, and has a cylindrical surface of lesser radius than that of the groove in the ball race.

8. An article loading and unloading structure for a machine comprising a support, a swinging arm on said support for movement about an axis and between working and unloading stations, an arbor on said arm for engaging in a hollow article and effective upon movement of the arm from working station to unloading station to cause the article to move with the arm, said arm having a bore therein, the axis of the bore being parallel to the axis of said arm, a plunger axially movable in said bore, an article engaging member on said plunger, and means responsive to movement of said arm from loading to unloading position to move the plunger axially in said bore and effect removal of said article from said arbor.

9. An article loading and unloading device comprising a support, a swinging arm on said support for movement between the working station and the unloading station, article holder devices eccentrically mounted on said arm for supporting an article during movement of the arm from the working station toward the unloading station, said arm having a bore therein, the axis of the bore being parallel to the axis of said arm, a plunger axially movable in said bore, an article engaging member on said plunger, and a device fixed on the support for engagement by the plunger as the arm approaches the unloading station and effective for producing axial movement of the plunger whereby said member engages and displaces the article in the direction of the axis of said plunger.

References Cited in the file of this patent
UNITED STATES PATENTS

| | | |
|---|---|---|
| 2,027,627 | Blood et al. | Jan. 14, 1936 |
| 2,313,482 | Rocks et al. | Mar. 9, 1943 |
| 2,329,301 | Schmidt et al. | Sept. 14, 1943 |
| 2,694,883 | Balsiger | Nov. 23, 1954 |